United States Patent [19]

Calhoun et al.

[11] 3,752,971

[45] Aug. 14, 1973

[54] EXPANDABLE SUM OF CROSS PRODUCT MULTIPLIER/ADDER MODULE

[75] Inventors: Donald F. Calhoun, Torrance; Robert E. Ziff, Los Angeles, both of Calif.

[73] Assignee: Hughes Aircraft Company, Culver City, Calif.

[22] Filed: Oct. 18, 1971

[21] Appl. No.: 190,023

[52] U.S. Cl. ................................................ 235/164

[51] Int. Cl. ............................................... G06f 7/52

[58] Field of Search ............................ 235/164, 156

[56] References Cited

UNITED STATES PATENTS 3,670,956 6/1972 Calhoun............................ 235/164

3,407,290 10/1968 Atrubin............................ 235/164

*Primary Examiner*—Malcolm A. Morrison

*Assistant Examiner*—David H. Malzahn

*Attorney*—W. H. MacAllister, Jr. et al.

[57] ABSTRACT

A high speed digital multiplier which includes a plurality of functionally and structurally identical multiplier modules. Each multiplier module is adapted to perform an N × N bit multiplication. In addition, each module accepts product bits and carry bits from other multiplier modules and adds them to the N × N bit product according to the appropriate bit weights. Several modules are interconnected for M × M bit multiplications where M is greater than N. The modules contain all the circuitry necessary for performing the multiplication.

5 Claims, 12 Drawing Figures

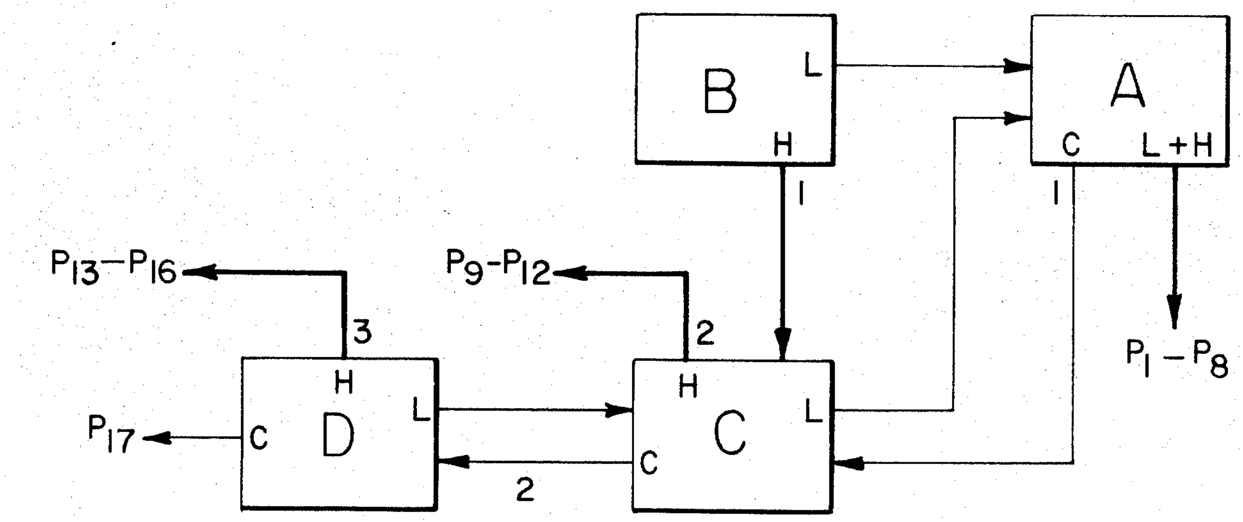
B
L
H
A
C
L+H
1
1
P1 – P8
P13–P16
3
H
P9-P12
2
H
C
L
D
C
P17
C
2
L

EXPANDABLE SUM OF CROSS PRODUCT MULTIPLIER/ADDER MODULE

BACKGROUND OF THE INVENTION

This invention relates generally to data processing circuits and more particularly to digital multiplier circuits.

One prior art method of binary multiplication is the repeated addition of the multiplicand into appropriate orders of an accummulator according to the digits of the multiplier. Multiplier circuits of this type require many functionally different circuits such as storage circuits, shift registers, and control circuits. This circuitry would have to be specifically designed for different word length multipliers and multiplicands.

Another type of prior art multiplier circuit is sometimes referred to as a simultaneous multiplier. This type of circuit has steady state signals representing the multiplicand and multiplier simultaneously applied to the input lines. After the transients in the multiplier circuit have disappeared, signals representing the product appear on the output lines. The product representation will remain as long as the input signals are maintained. These prior art multiplier circuits are generally designed to provide partial products of the multiplier and multiplicand and then to sum the partial products to obtain the final product. These prior art circuits are specially designed for the particular word length of the multiplier and multiplicand.

SUMMARY OF THE INVENTION

The present invention is a high speed digital multiplier which includes a plurality of functionally and structurally identical building block multiplier modules. Each building block multiplier module is designed to perform a multiplication of a fixed number of bits (binary digits). For example, the building block multiplier module may be a four by four bit multiplier. In addition, each module accepts product bits and carry bits from other multiplier modules and adds them to the N × N bit product according to the appropriate bit weights. Larger word length multiplications are achieved by interconnecting a plurality of the identical building block multiplier modules. The identical multiplier modules contain all circuitry necessary for the interconnection of a plurality of the modules to perform the longer word length multiplication. No additional circuitry is required. For example, if the multiplier and multiplicand each contain eight bits, four of the identical building block multiplier modules are interconnected to provide the eight by eight bit multiplication.

Each of the identical multiplier modules may be formed from plurality of identical full adder circuits with appropriate gating. Several different types of off-the-shelf integrated circuit adder circuit packages may be used to form the identical building block multiplier modules. This use of identical full adder circuits is particularly advantageous for large scale integration techniques.

DESCRIPTION OF THE DRAWINGS

The novel features and advantages of the invention will become more apparent from the following detailed description when taken in conjunction with the accompanying drawings in which.

DESCRIPTION OF THE PREFERRED EMBODIMENT

Figure 1:
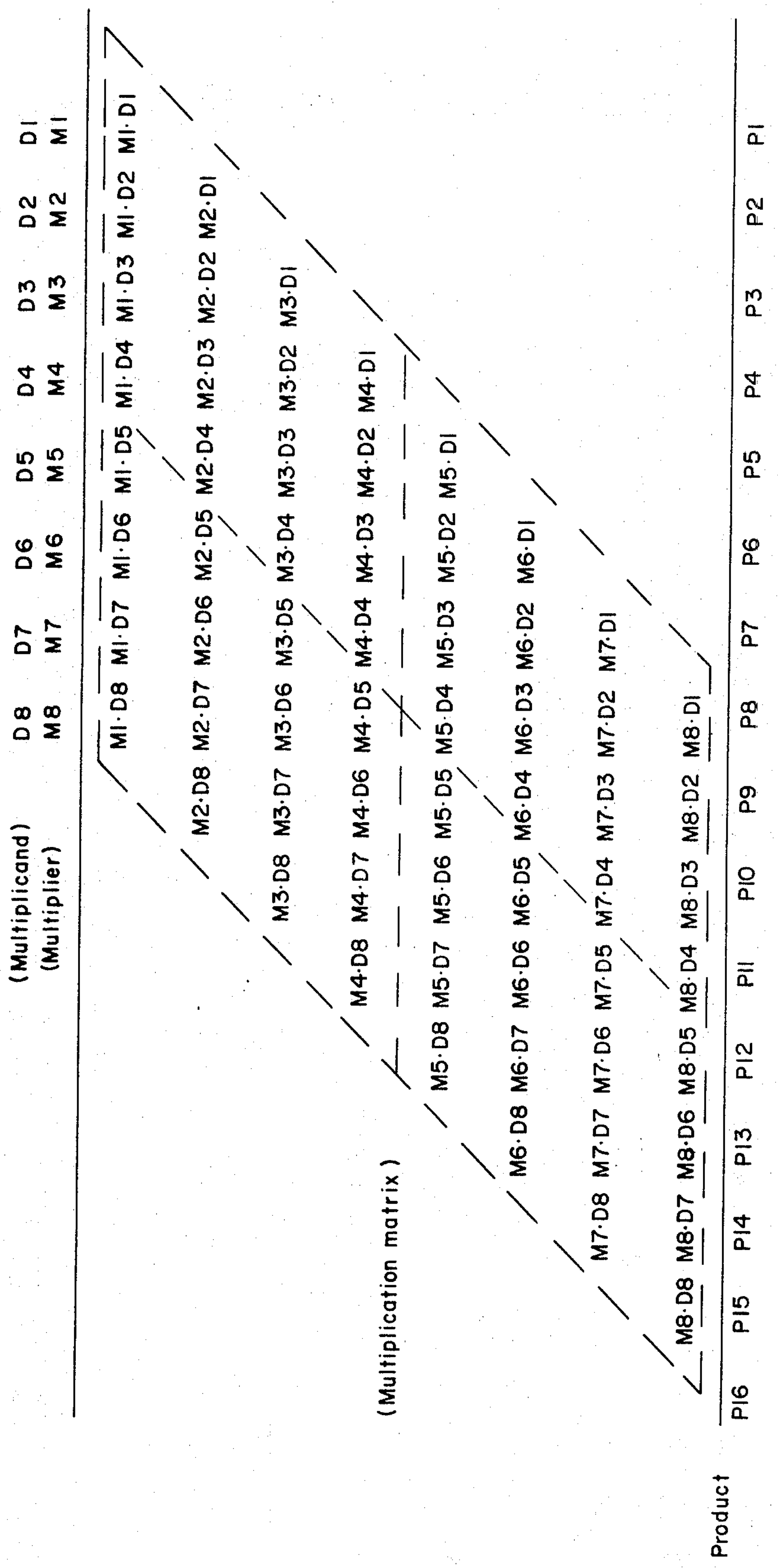
FIG. 1 is a multiplication matrix for an 8 × 8 bit multiplication.

In general, the multiplication of two N bit numbers is done by ANDing each bit $M_j$ of the multiplier by each bit $D_i$ of the multiplicand to form a slanted matrix of the ANDed bits. FIG. 1 shows such a slanted matrix for an 8 × 8 bit multiplication. The product P of the multiplication is then formed by adding the columns of the slanted matrix.

Figure 2:
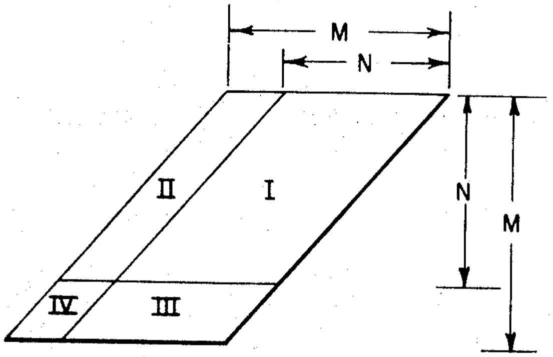
FIG. 2 schematically depicts the enlargement of an N × N matrix to an M × M matrix.
Figure 3:
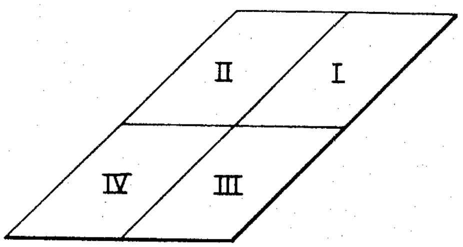
FIG. 3 schematically depicts an M × M matrix formed from four identical N × N matrices.

If such a multiplication scheme is implemented directly in hardware, it presents certain disadvantages. The operation time is relatively long because of the column addition and the carry propagation times. An N × N multiplier, once built, is hard to expand to larger word lengths, for example to M × M, where M is greater than N, unless additional hardward of a different design is added. FIG. 2 illustrates this point. FIG. 2 shows schematically the slanted matrix of an N × N multiplication (area I) and that of an M × M multiplication (areas I, II, III, IV). The hardware necessary to expand the range of the multiplication (areas II, III and IV) require a different design than for area I. An exception would be when M is equal to some multiple of N, for example M = 2N. In this case the three extra matrices (areas II, III and IV) necessary to expand the multiplication would look identical to matrix I. This is shown in FIG. 3.

Figure 4:
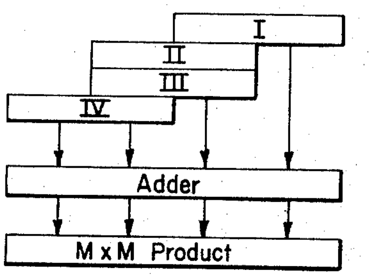
Fig. 4. Prior Art
FIG. 4 shows one prior art method of performing an M × M multiplication by combining several N × N multiplications.

The M × M bit multiplication may be accomplished by combining the results of four independent N × N bit multipliers. A prior art method is shown in FIG. 4 for the case when M equals 2N. Line 1 of FIG. 4 represents the product of the N × N bit multiplication performed by matrix I of FIG. 3; line II represents the product of the N × N multiplication performed by matrix II of FIG. 3, and so forth for lines III and IV. As shown in FIG. 4, an adder combines the outputs of the various N × N bit multipliers. The present invention includes in the design of a building block multiplier module all circuitry for performing an N × N bit multiplication and adding the product to the products of the other N × N bit multiplications. The use of a separate output adder required by the prior art as shown in FIG. 4 is not required.

According to the preferred embodiment of the present invention, the size of N for the building block multiplier module is based on the following criteria: 1) the size of the M × M multiplication which controls the number of building block multiplier modules required, and 2) the efficiency of the operation. If N is large, the number of building block multiplier modules required to perform an M × M multiplication is relatively low, but a loss of efficiency can occur. For example, if N were equal to 5, one would have to build a 15 × 15 setup in order to obtain a 12 × 12 bit multiplication. On the other hand, if N is small, efficiency increases but the number of building block multipliers required to perform an operation becomes too large. For example, if N were equal to 3 and M were equal to 15, then 25 building block multiplier modules would be required. In the preferred embodiment, a building block multiplier module for N equal to 4 is desirable for applications which require M equal to 8, 12 or 16. It should be understood that a larger or smaller size building block multiplier module could be used where appropriate for the intended applications.

Figure 5:
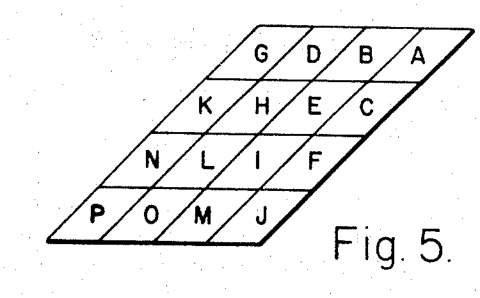
FIG. 5 schematically depicts a 16 × 16 bit multiplication matrix divided into sixteen 4 × 4 bit matrices.
Figures 6, 7:
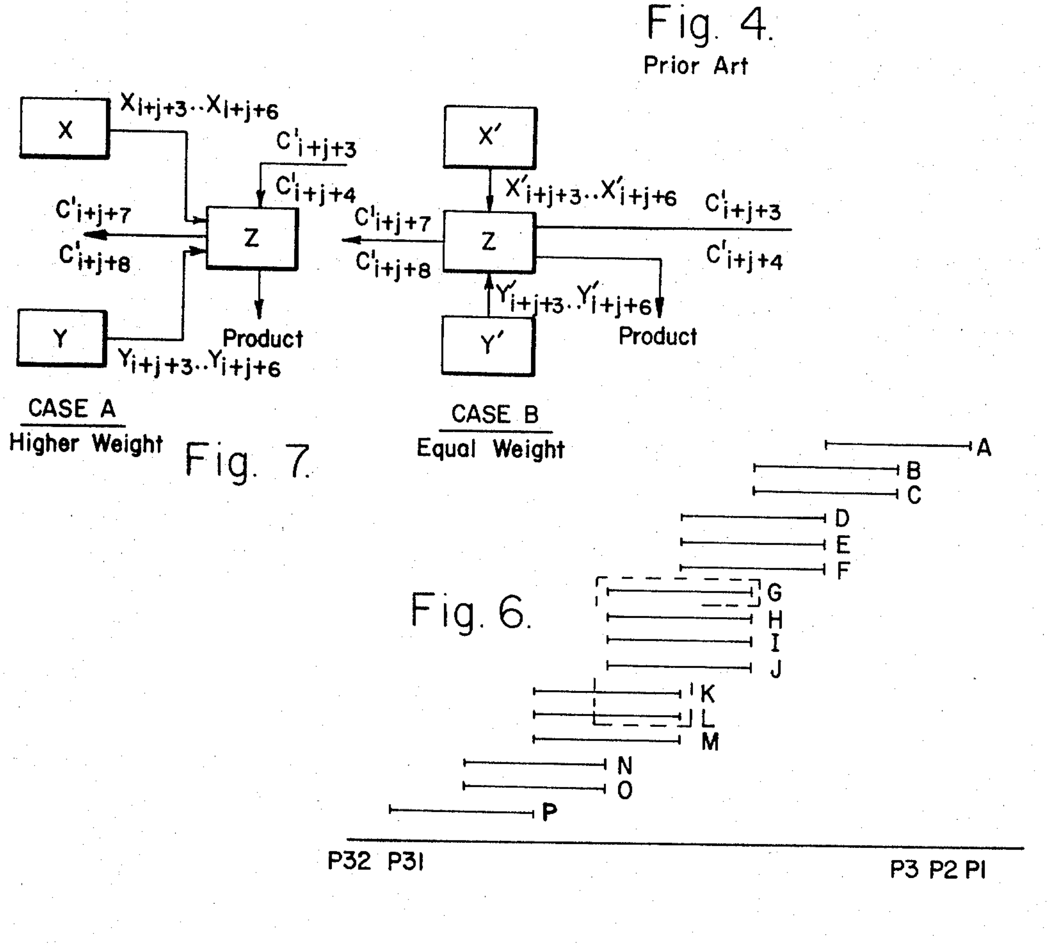
FIG. 6 schematically depicts the 16 eight bit products for the 4 × 4 bit matrices of FIG. 5.
FIG. 7 is a schematic diagram of the interrelationship of a building block multiplier multiplier with other modules.

The preferred 4 × 4 building block multiplier will now be discussed with reference to an overall 16 × 16 bit multiplication. If the slanted matrix for a 16 × 16 multiplication is divided into 16, 4 × 4 bit multiplications, each of these could be performed by a building block multiplier module. This division of the slanted matrix is schematically shown in FIG. 5. Each of the blocks A through P in FIG. 5 indicates a 4 × 4 bit multiplication. This can be redrawn schematically in simpler form as shown in FIG. 6. Line A of FIG. 6 represents the 8 bit product of the 4 × 4 bit multiplication performed by building block multiplier module A of FIG. 5. The bit weight of the product for multiplier module A will be from $2^0$ to $2^7$ which will be specified for simplicity as 1 through 8. Similarly, product B and C will range in weight from 5 to 12. Similarly, products D, E and F will range in weight from 9 to 16 and so forth. Note that the word "product" here refers to the result of a 4 × 4 bit multiplication which is performed by a building block multiplier module.

As described supra, the building block multiplier module is to be designed so that a separate adder circuit will not be required. Accordingly, each building block multiplier module must be capable of adding to the highest 4 bits of its product two more 4 bit numbers of the same weight coming from two different building block multiplier modules. This is shown by the dotted lines in FIG. 6. In the particular case shown in FIG. 6 the lower 4 bits of products K and L, ranging in weight from 17 to 20 are added to the higher 4 bits of product G, also ranging in weight from 17 to 20.

Each building block multiplier module is also required to accept carry signals from lower weight building block multiplier modules. In the case of building block multiplier module G, it might receive carry bits from building block multiplier modules D, E or F.

The functions of a building block multiplier module may now be summarized as:

A. Multiply two 4 bit numbers.

B. Add to the highest 4 bits of the product two more 4 bit words of the same weight.

C. Provide for the addition of carry bits coming from lower weight building block multipliers.

In the general case, the 4 × 4 bit multiplication (function A of the building block multiplier) can be performed by a building block multiplier module labeled Z. This multiplication may be represented as:

$$
\begin{array}{cccccccc}
 & & & & D_{i+3} & D_{i+2} & D_{i+1} & D_i \\
 & & & & M_{j+3} & M_{j+2} & M_{j+1} & M_j \\
\hline
 & & & M_j & (D_{i+3} & D_{i+2} & D_{i+1} & D_i) \\
 & & M_{j+1} & (D_{i+3} & D_{i+2} & D_{i+1} & D_i) & \\
 & M_{j+2} & (D_{i+3} & D_{i+2} & D_{i+1} & D_i) & & \\
M_{j+3} & (D_{i+3} & D_{i+2} & D_{i+1} & D_i) & & & \\
\hline
Z_{i+j+6} & Z_{i+j+5} & Z_{i+j+4} & Z_{i+j+3} & Z_{i+j+2} & Z_{i+j+1} & Z_{i+j} & Z_{i+j-1}
\end{array}
$$

Multiplier bits $M_j$ through $M_{j+3}$ are ANDed with multiplicand bits $D_i$ through $D_{i+3}$ to obtain product bits $Z_{i+j-1}$ through $Z_{i+j+6}$. Functions B and C of the building block multiplier module may be represented as:

$$
\begin{array}{cccccccccc}
 & & & C'_{i+j+4} & C'_{i+j+3} & & & & & \\
 & & Z_{i+j+6} & Z_{i+j+5} & Z_{i+j+4} & Z_{i+j+3} & Z_{i+j+2} & Z_{i+j+1} & Z_{i+j} & Z_{i+j-1} \\
 & & X_{i+j+6} & X_{i+j+5} & X_{i+j+4} & X_{i+j+3} & & & & \\
 & & Y_{i+j+6} & Y_{i+j+5} & Y_{i+j+4} & Y_{i+j+3} & & & & \\
\hline
C'_{i+j+8} & C'_{i+j+7} & Z'_{i+j+6} & Z'_{i+j+5} & Z'_{i+j+4} & Z'_{i+j+3} & Z_{i+j+2} & Z_{i+j+1} & Z_{i+j} & Z_{i+j-1}
\end{array}
$$

Bits $X_{i+j+3}$ through $X_{i+j+6}$ and bits $Y_{i+j+3}$ through $Y_{i+j+6}$ and carry bits $C'_{i+j+3}$ and $C'_{i+j+4}$ are added to the product bits $Z_{i+j-1}$ through $Z_{i+j+6}$ according to the appropriate bit weights to obtain final output bits. The bits X's and Y's come from either higher or same weight building block multipliers labeled X and Y.

FIG. 7 shows a schematic diagram of the generalized building block multiplier Z and the other building block multipliers X and Y. The diagram labeled "case A" shows building block multiplier Z adding to its own four highest bits two 4 bit words coming from higher weight building block multipliers X and Y. The diagram of FIG. 7, labeled "case B" shows building block multiplier Z adding to its own four highest bits two 4 bit words coming from equal weight building block multipliers X' and Y'. Any building block multiplier Z may be a combination of case A and case B shown in FIG. 7. The schematic diagrams of FIG. 7 also show the carry bits $C'_{i+j+3}$ and $C'_{i+j+4}$ coming from lower weight building block multiplier modules.

Figure 8:
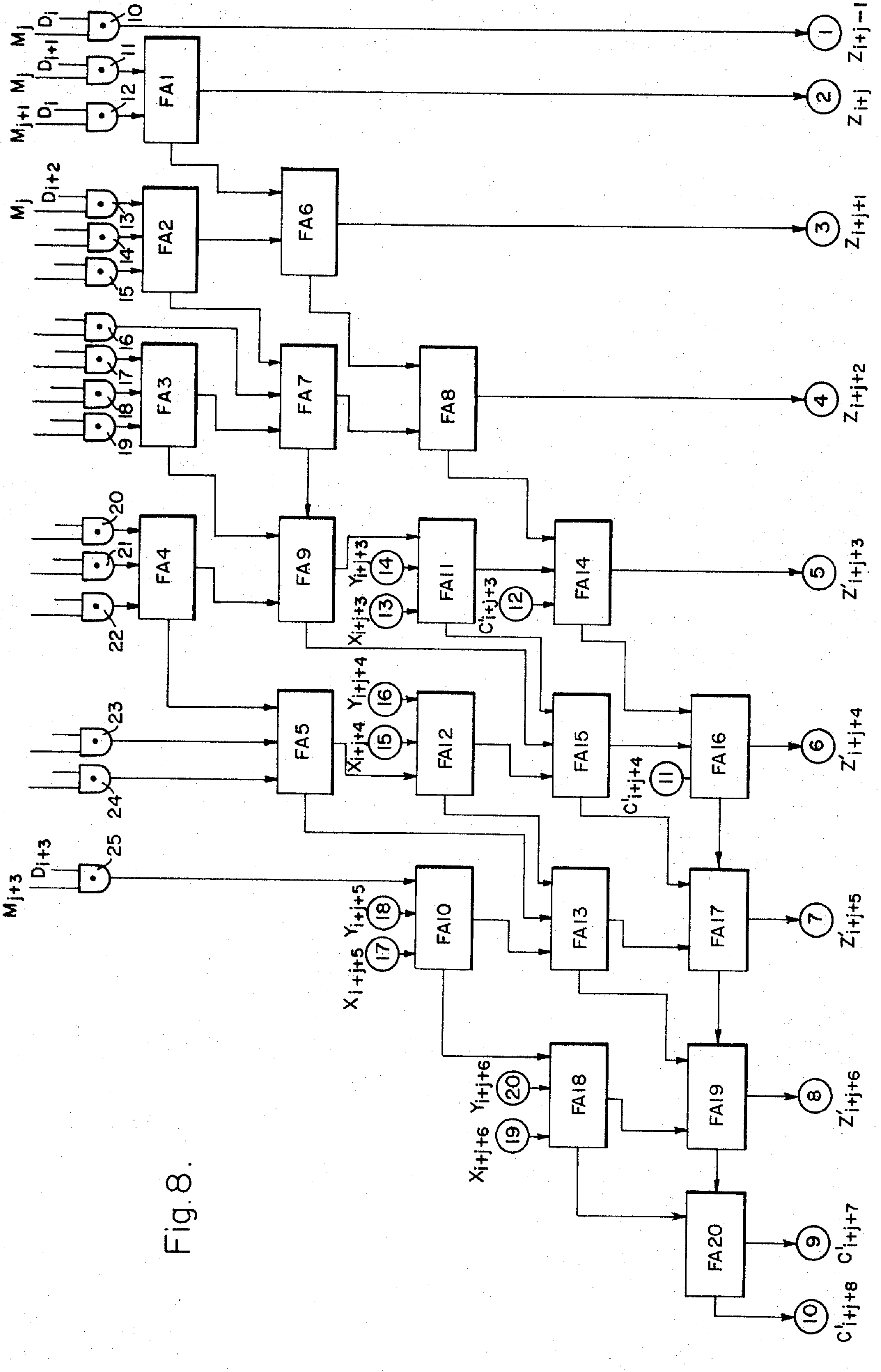
FIG. 8 is a schematic diagram of a preferred embodiment of a building block multipler module of the present invention.

Now that the functions of the 4 × 4 bit building block multiplier module have been defined, the logical circuitry to perform these functions may be derived as illustrated by a preferred embodiment of FIG. 8. The building block multiplier module includes a plurality of full adder circuits FA-1 through FA-20. Each of these full adder circuits may be a standard off-the-shelf full adder circuit. A full adder integrated circuit package (e.g., SN54H183) manufactured by Texas Instruments, Inc. is suitable. The building block multiplier also includes a plurality of AND gates 10 through 25 which gate the pairs of multiplier and multiplicand bits. For example, AND gate 10 gates multiplier bit $M_j$ with multiplicand bit $D_i$; AND gate 11 gates multiplier bit $M_j$ with multiplicand bit $D_{i+1}$; and so forth to AND gate 25 which gates multiplier bit $M_{j+3}$ and multiplicand bit $D_{i+3}$. Each of the full adder circuits FA-1 through FA-20 provides a sum output which is shown at the bottom of the full adder block and a carry output which is shown as an output of adder circuit FA-20. It should be understood that while all of the full adder circuits are described as full adders, some of them function as half adders since they only have two inputs, i.e., adder circuits FA-1, FA-6, FA-8 and FA-20.

The full adders FA-1 through FA-20 sum the ANDed bits in accordance with the 4 × 4 bit multiplication matrix, sum 4 bits from each of two other building block multiplier modules, and sum carry bits from lower order building block multiplier modules.

The product output bits of the building block multiplier module are available on output pins 1 through 8 as shown in FIG. 8. Bits $Z_{i+j-1}$ through $Z_{i+j+2}$ are available on pins 1 through 4 respectively. Bits $Z'_{i+j+3}$ through $Z'_{i+j+6}$ are available on pins 5 through 8 respectively. These higher order bits are identified as Z' to indicate the summation of the X and Y and carry bits from other building block multiplier modules. Carry bits $C'_{i+j+7}$ and $C'_{i+j+8}$ are available on pins 9 and 10, respectively.

The ANDed multiplier and multiplicand bits are applied to the building block multiplier module through the AND gates 10 through 25 as previously discussed.

Bits $X_{i+j+3}$ and $Y_{i+j+3}$ are applied to full adder FA-11 of the building block multiplier module on pins 13 and 14. These bits originate from output pins 1 of building block multiplier modules X and Y (case A of FIG. 7) or from output pins 5 of building block multiplier modules X' and Y' (case B of FIG. 7).

Bits $X_{i+j+4}$ and $Y_{i+j+4}$ are applied to full adder FA-12 of the building block multiplier module on pins 15 and 16. These bits originate from output pins 2 of building block multiplier modules X and Y (case A of FIG. 7) or from output pins 6 of building block multiplier modules X' and Y' (case B of FIG. 7).

Bits $X_{i+j+5}$ and $Y_{i+j+5}$ are applied to full adder FA-10 of the building block multiplier module on pins 17 and 18. These bits originate from output pins 3 of building block multiplier modules X and Y (case A of FIG. 7) or from output pins 7 of building block multiplier modules X' and Y' (case B of FIG. 7).

Bits $X_{i+j+6}$ and $Y_{i+j+6}$ are applied to full adder FA-18 of the building block multiplier module on pins 19 and 20. These bits originate from output pins 4 of building block multiplier modules X and Y (case A of FIG. 7) or from output pins 8 of building block multiplier modules X' and Y' (case B of FIG. 7).

Carry bit $C'_{i+j+3}$ is applied to full adder FA-14 of the building block multiplier module on pin 12. Carry bit $C'_{i+j+4}$ is applied to full adder FA-16 of the building block multiplier module on pin 11. These carry bits originate from output pins 9 and 10 respectively, of a lower weight building block multiplier module.

Figure 9:
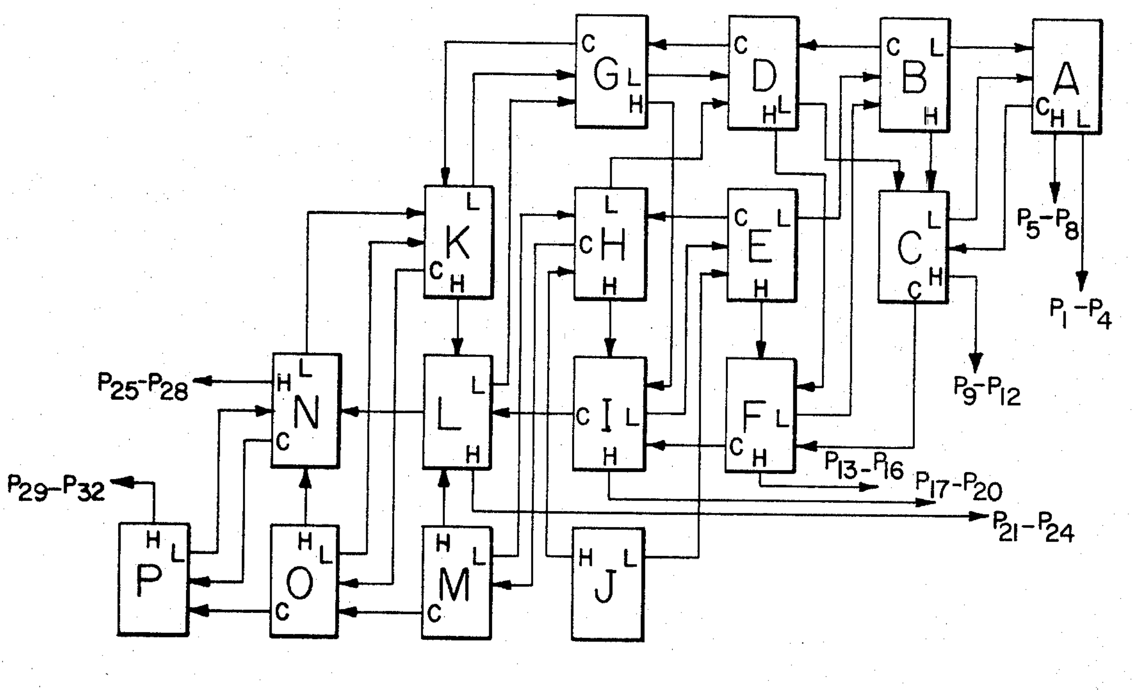
FIG. 9 shows the interconnection of sixteen 4 × 4 bit building block multiplier modules of the present invention to perform a 16 × 16 bit multiplication.

Sixteen of the 4 × 4 bit building block multiplier modules may be interconnected to form a 16 × 16 bit multiplier. FIG. 5 schematically shows the division of the 16 × 16 bit multiplication matrix into sixteen 4 × 4 bit multiplication matrices. Each of the 4 × 4 bit multiplications may be performed by one 44 × 4 bit building block multiplier module. FIG. 9 shows the interconnection of the sixteen 4 × 4 bit building block multiplier modules to perform the 16 × 16 bit multiplication. The 8 × 8 bit multiplication matrix shown in FIG. 1 may be considered to be a portion of the larger 16 × 16 bit multiplication matrix. The dashed lines in FIG. 1 divide the matrix into four 4 × 4 bit matrices. These matrices correspond to blocks A, B, C and E shown in FIG. 5 for the 16 × 16 bit multiplication. The ANDed bits for the 4 × 4 bit matrix A of FIG. 1 will be applied to the inputs of building block multiplier module A of FIG. 9 as specified in detail in FIG. 8. Similarly, ANDed bits will be applied to the remaining building block multiplier modules of FIG. 9 in accordance with the associated 4 × 4 bit multiplication matrix. These inputs to the building block multiplier modules are not shown in FIG. 9.

FIG. 9 shows the interconnection of the building block multiplier modules. Each module has an output labeled L for the lowest four bits of its product. Each module has an output labeled H for the highest four bits of its product. Each module also has an output labeled C for the carries of its products. The L output of the module corresponds to output lines 1-4 for bits $Z_{i+j-1}$ to $Z_{i+j+2}$ shown in FIG. 8. The H output of the module corresponds to output pins 5-8 for bits $Z'_{i+j+3}$ to $Z'_{i+j+6}$ shown in FIG. 8. The C output of the module corresponds to output pins 9 and 10 for bits $C'_{i+j+7}$ and $C'_{i+j+8}$ shown in FIG. 8.

FIG. 9 shows one of many possible interconnections of the building block multiplier modules. The particular interconnection shown in FIG. 9 was chosen for minimum time delay as will be expalined later. The building block multiplier modules in FIG. 9 are arranged in columns. The product output of modules in the same column have the same bit weight. The lower four bits of the output of module A have bit weights 1-4. The higher four bits of the output of module A have bit weights 5-8. The lower four bits of the outputs of modules B and C have bit weights 5-8. The higher four bits of the outputs of modules B and C have bit weights 9-12. The lower four bits of the outputs of modules D, E, and F have bit weights 9-12. The higher four bits of the outputs of modules D, E and F have bit weights 13-16. In general, the lower four bits of the outputs of any group of modules have the same bit weights as the higher four bits of the outputs of the next lower order group of modules. This relationship is shown by the interconnection of FIG. 9. The lower four bits of the output of any module are applied to a module in the next lower order group of modules. The lower four bits of the output of module B are applied to module A to be summed with the higher order four bits of module A, and so forth for the other modules.

The time delays of the interconnection shown in FIG. 9 will now be analyzed. Information is input in parallel to all building block multiplier modules. Therefore, the lower four bits of the output products of all modules are created simultaneously, with a time delay $t_1$ from the beginning of the operation. The higher four bits are functions not only of the 4 × 4 bit multiplication of the particular module, but also of information from other modules. If this information is received from a higher weight module (case A of FIG. 7), there is no additional delay involved since this information arrives faster than the module's own 4 × 4 bit multiplication can take place. If this information is received from an equal weight module (case B of FIG. 7), there is a delay. Module Z must wait for a time $t_3$ for modules X' or Y' or both to process their information.

The most time consuming operation is the processing of the carry which is advanced from a lower weight module. The largest delay path, created by the processing of $C'_{i+j+3}$ is $t_2$. Since the delay $t_3$ described above always occurs within the delay $t_2$, $t_3$ will be replaced by $t_2$ for worst case analysis.

Figure 10:
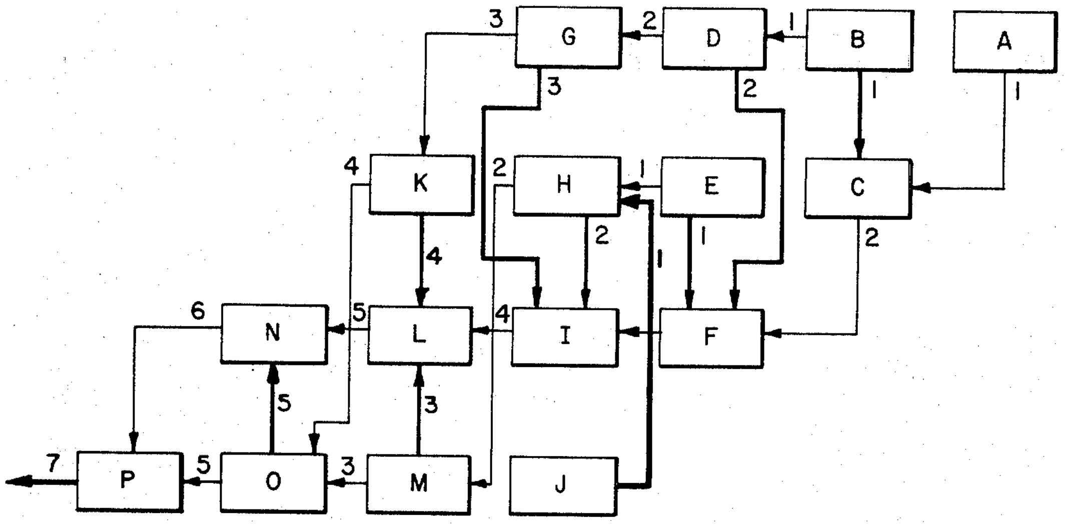
FIG. 10 shows the time delays for the circuit of FIG. 9.

FIG. 10 is a redrawing of FIG. 9 with the non-time delaying paths eliminated. The narrower line arrows show carry paths ($t_2$ type delays). The wider line arrows show product paths ($t_3$ type delays). The numbers adjacent the arrows indicate the time at which information is transmitted. For example, a 3 indicates that information is transmitted at time $t_1 + 3t_2$.

Transfer of time delayed information between modules starts after $t_1 + t_2$ has elapsed. At this time, the following takes place: carry is transmitted from A to C, from B to D, and from E to H; products are transmitted from B to C, from J to H and from E to F. These transfers are indicated in FIG. 10 by the number 1 adjacent the appropriate arrow. After an interval $t_1 + 2t_2$, the modules that received information at $t_1 + t_2$ transmit new information; carry from D to G from C to F, and from H to M; products are transmitted from D to F and from H to I. These transfers are indicated in FIG. 10 by the number 2 adjacent the appropriate arrow. This analysis may be continued with the numerals adjacent the arrows in FIG. 10 indicating the time at which the transfer takes place. If the analysis is completed, the total multiplication time is $t_1 + 7t_2$.

Figure 11:
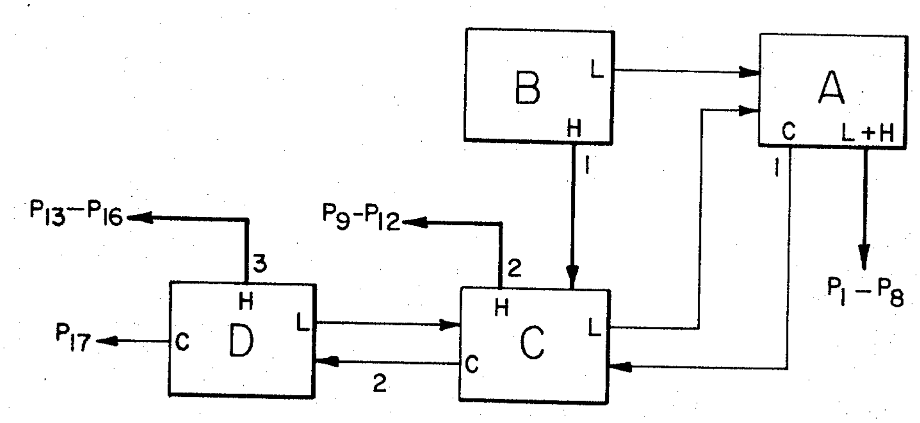
FIG. 11 shows the interconnection of four 4 × 4 bit building block multiplier modules of the present invention to perform an 8 × 8 bit multiplication.

FIG. 11 shows the interconnection of four 4 × 4 bit building block multiplier modules for an 8 × 8 bit multiplication. The number adjacent the arrows indicate the time at which information is transmitted. The total time for the 8 × 8 bit multiplication is $t_1 + 3t_2$.

Figure 12:
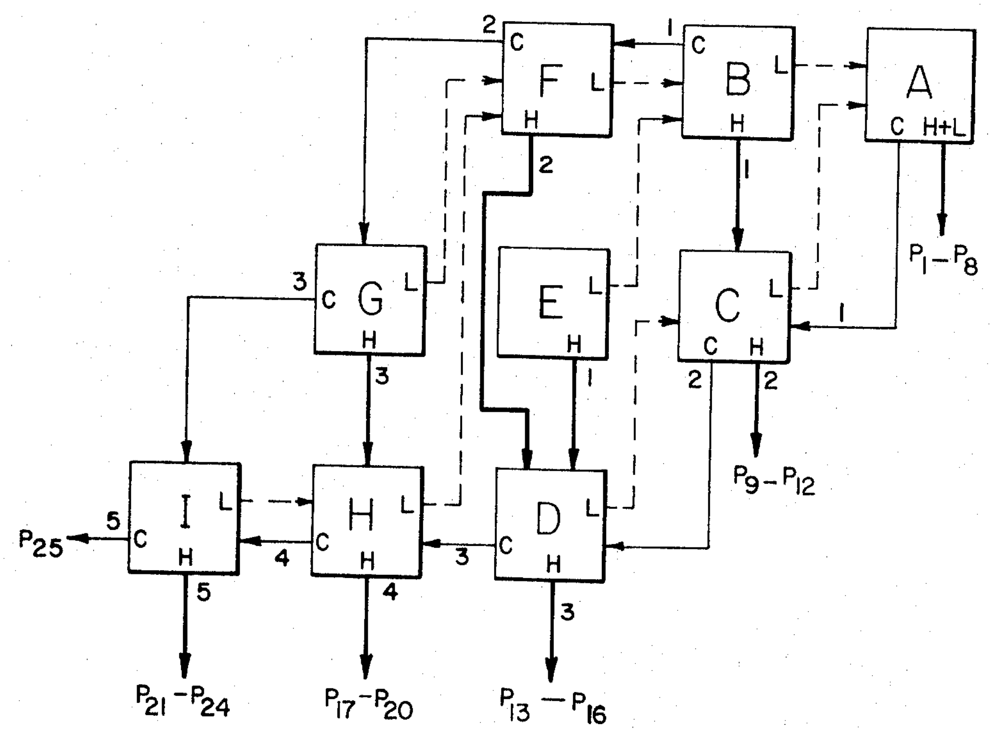
FIG. 12 shows the interconnection of nine 4 × 4 bit building block multiplier modules of the present invention to perform a 12 × 12 bit multiplication.

FIG. 12 shows the interconnection of nine 4 × 4 bit building block multiplier modules for a 12 × 12 bit multiplication. The number adjacent the arrows indicate the time at which information is transmitted. The total time for the 12 × 12 bit multiplication is $t_1 + 5t_2$.

While preferred embodiments of the invention have been disclosed, it should be clear that the present invention is not limited thereto as many variations will be readily apparent to those skilled in the art without departing from the spirit and scope of the invention as defined by the following claims.

What is claimed is:

1. A modular digital circuit for forming a final product of at least 4N bits from first and second binary words each having at least 2N bits, said circuit comprising a plurality of substantially identical interconnected multiplier/adder circuit modules including a first order module and a plurality of higher order modules, wherein:

the output from each of said modules provides 2N product bits and two carry bits, the 2N product bits from said first order module forming the lowest weight 2N bits of said final product;

said first order module has a first set of inputs coupled to receive the lowest weight N bits from each of said first and second binary words respectively; and said first order module has a second set of inputs coupled to receive two additional groups of N bits, said groups forming respectively the N lowest weight product bits output from each of two second order modules included within said plurality of higher order modules.

2. The modular digital circuit of claim 1 in which N is an integer equal to or greater than four and the maximum word length of said first and second binary words is a multiple of N.

3. The circuit of claim 1 wherein a particular one of said two second order modules has a third set of inputs coupled to receive said two carry bits output from said first order module.

4. An expandable sum of cross products multiplier/adder module comprising:

means for forming the 8 bit cross product from two 4 bit inputs;

means for adding to the most significant 4 bits of said cross product two additional 4 bit inputs; and means for adding to the fifth and sixth most significant bits of said cross product a 2 bit carry input.

5. The module of claim 1, further comprising means for outputting a 2 bit carry output.

* * * * *